(12) United States Patent
Speggiorin

(10) Patent No.: US 7,828,256 B2
(45) Date of Patent: Nov. 9, 2010

(54) QUICK DEVICE FOR VIDEO AND PHOTOGRAPHIC EQUIPMENT

(75) Inventor: Paolo Speggiorin, Mussolente (IT)

(73) Assignee: Lino Manfrotto+Co. S.p.A., Bassano Del Grappa (VI) (IT)

( * ) Notice: Subject to any disclaimer, the term of this patent is extended or adjusted under 35 U.S.C. 154(b) by 493 days.

(21) Appl. No.: 11/993,115

(22) PCT Filed: Mar. 30, 2006

(86) PCT No.: PCT/EP2006/002891

§ 371 (c)(1),
(2), (4) Date: Feb. 6, 2008

(87) PCT Pub. No.: WO2006/136218

PCT Pub. Date: Dec. 28, 2006

(65) Prior Publication Data

US 2010/0148023 A1    Jun. 17, 2010

(30) Foreign Application Priority Data

Jun. 21, 2005 (IT) .......................... PD2005A0186

(51) Int. Cl.
*F16M 11/04* (2006.01)
(52) U.S. Cl. .............. 248/187.1; 248/177.1; 248/178.1; 248/220.21; 396/419; 396/428
(58) Field of Classification Search ............. 248/178.1, 248/177.1, 187.1, 176.1, 180.1, 220.21, 220.22, 248/221.11, 222.11, 222.13; 396/419, 428; 403/321, 326
See application file for complete search history.

(56) References Cited

U.S. PATENT DOCUMENTS

| 2,824,504 | A |   | 2/1958  | Bethmann |
|-----------|---|---|---------|----------|
| 4,929,973 | A | * | 5/1990  | Nakatani .................. 248/177.1 |
| 5,230,490 | A |   | 7/1993  | Sloop |
| 5,785,286 | A |   | 7/1998  | Hiesinger et al. |
| 6,164,843 | A | * | 12/2000 | Battocchio .................. 396/419 |
| 6,196,504 | B1| * | 3/2001  | Lemke ..................... 248/187.1 |

(Continued)

FOREIGN PATENT DOCUMENTS

DE        90 16 714  U1    2/1991

OTHER PUBLICATIONS

ISR and Written Opinion (PCT/EP2006/002891).

*Primary Examiner*—Terrell Mckinnon
*Assistant Examiner*—Todd M. Epps
(74) *Attorney, Agent, or Firm*—Kristina Castellano; Castellano PLLC

(57) ABSTRACT

A quick-fit device for video and photographic equipment comprises a first attachment member in the form of a plate which can be fixed to the equipment and a second attachment member including a seat for the plate which can be fixed to a supporting head; a safety device comprising a spring-loaded arm bearing a stop tooth acting on a presser designed to removably lock the plate in the seat is provided in the seat. The tooth has a ramp with an inclined plane from the part facing the seat and a stop shoulder on the opposite part; the presser has an appendage which is capable of riding over the tooth passing from a position against the ramp to a position against the shoulder in passing from a position in which the plate is released to a position in which the same is locked in the seat.

7 Claims, 3 Drawing Sheets

U.S. PATENT DOCUMENTS 6,364,259 B1   4/2002  Boudard
6,712,322 B2 * 3/2004  Nakatani ................. 248/187.1
6,739,559 B2 * 5/2004  Nakatani ................. 248/187.1

* cited by examiner

QUICK DEVICE FOR VIDEO AND PHOTOGRAPHIC EQUIPMENT

CLAIM FOR PRIORITY

This application is a U.S. National Stage Application of PCT/EP2006/002891 filed on 30 Mar. 2006, which claims priority to Italian application PD2005A000186 filed on 21 Jun. 2005, the contents of both of which are incorporated herein by reference.

TECHNICAL FIELD

This invention relates to a quick-fit device designed to connect video or photographic equipment to the head of a tripod or other support incorporating the features mentioned in the precharacterising clause of the principal claim.

BACKGROUND ART

Devices incorporating these features are known from the applicant's present product range.

The known devices have the main disadvantage that they involve the use of many component parts which have to be assembled together and incorporated into a head for photographic (or video-photographic) equipment for the purpose not only to ensure that the equipment is secured but also to prevent the equipment from being accidentally released and falling when being removed from the head.

DISCLOSURE OF THE INVENTION

The main object of the invention is to provide a quick-fit device which effectively satisfies the abovementioned requirements and can at the same time be constructed with a small number of components. Another object of the invention is to provide a quick-fit device which is easy and safe to use.

These and other objects which will be indicated below are accomplished according to the invention through a quick-fit device constructed in accordance with the appended claims.

BRIEF DESCRIPTION OF THE DRAWINGS

Other advantages and characteristics of the present invention will become clear from the following detailed description which is given with reference to the appended drawings which are provided purely by way of non-limiting example and in which.

BEST MODE OF CARRYING OUT THE INVENTION

Figure 1:
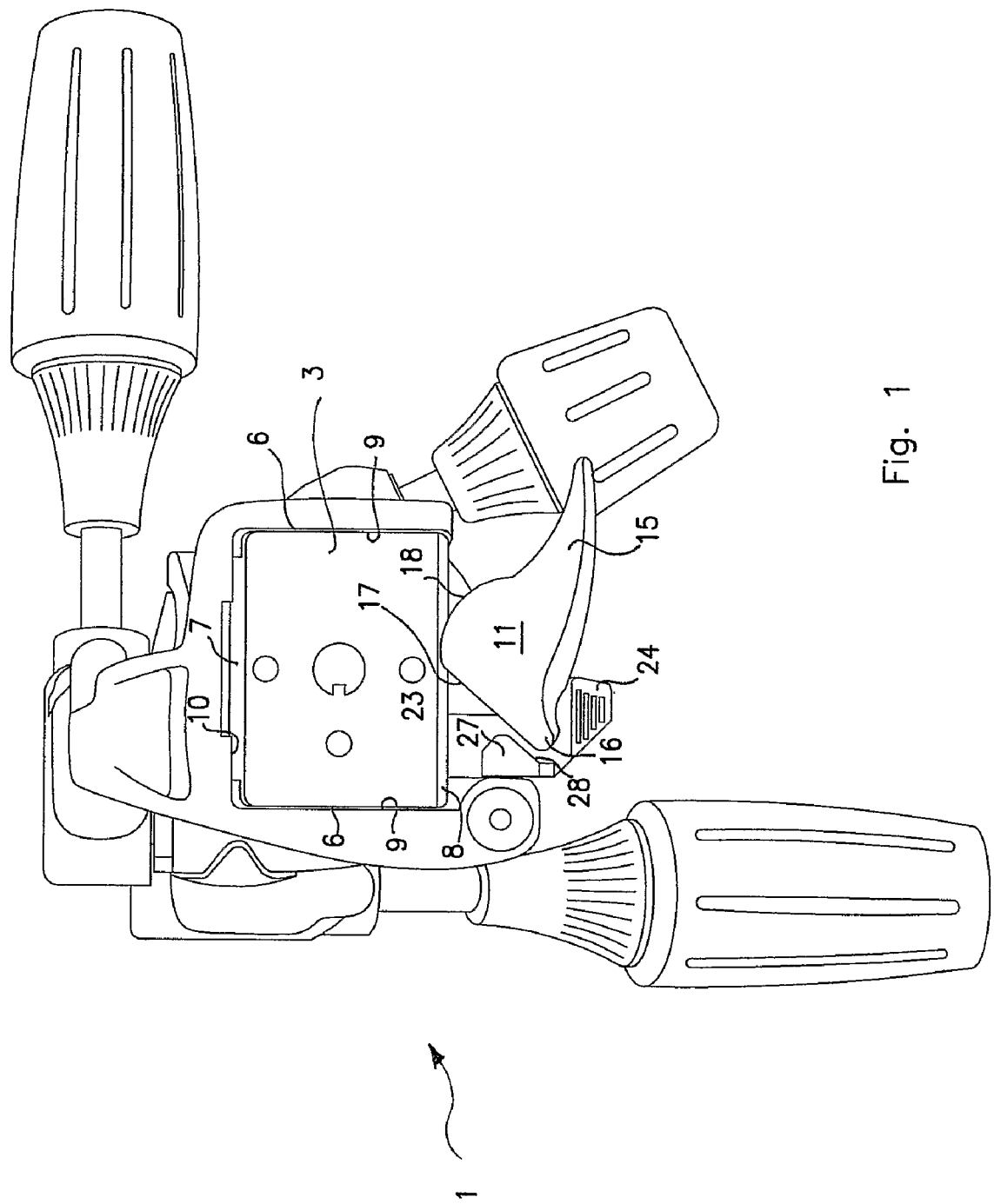
FIG. 1 is a plan view from above of a quick-fit device according to the invention incorporated into a photographic head.
Figure 2:
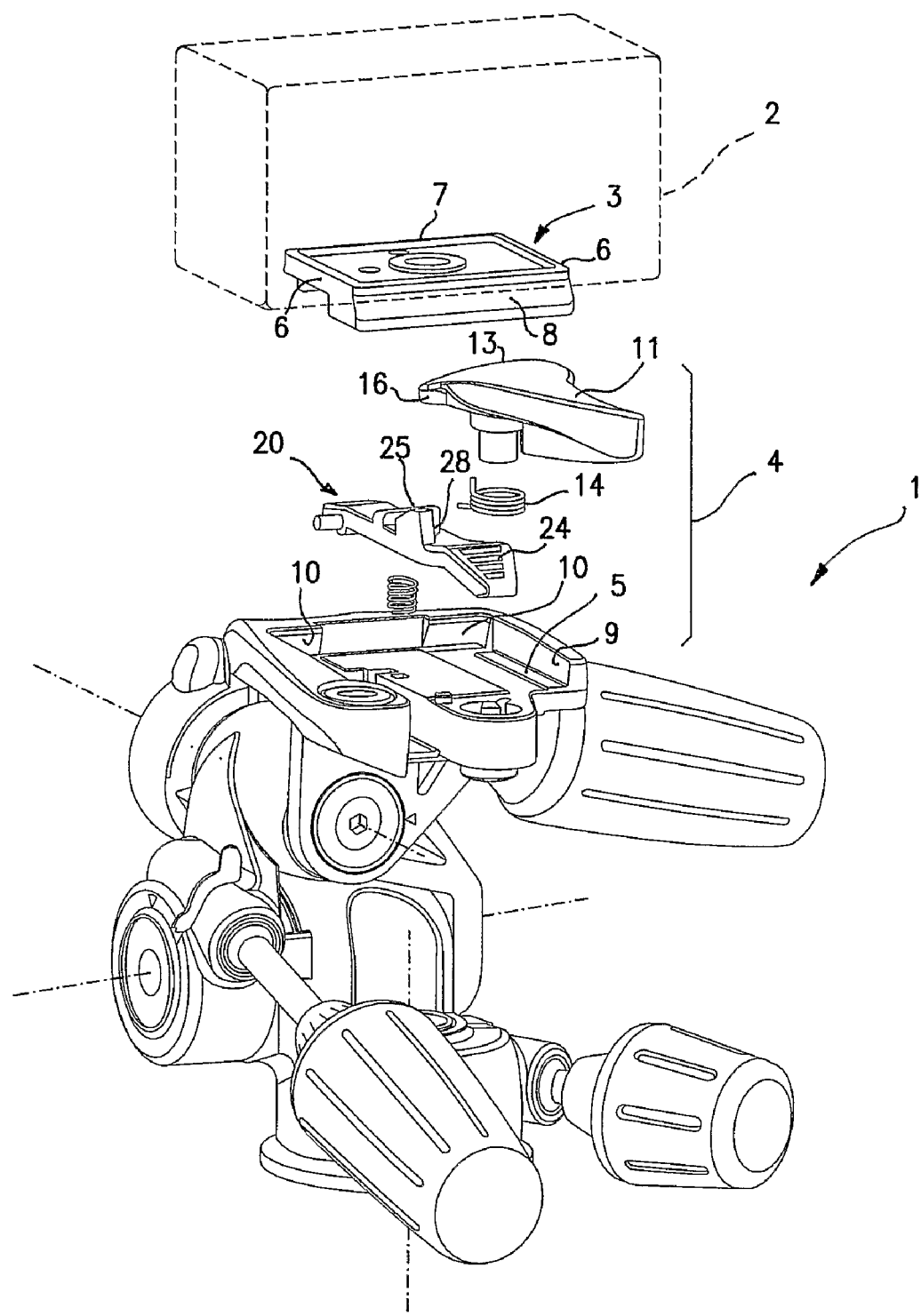
FIG. 2 is an exploded perspective view of the head in FIG. 1.
Figure 3:
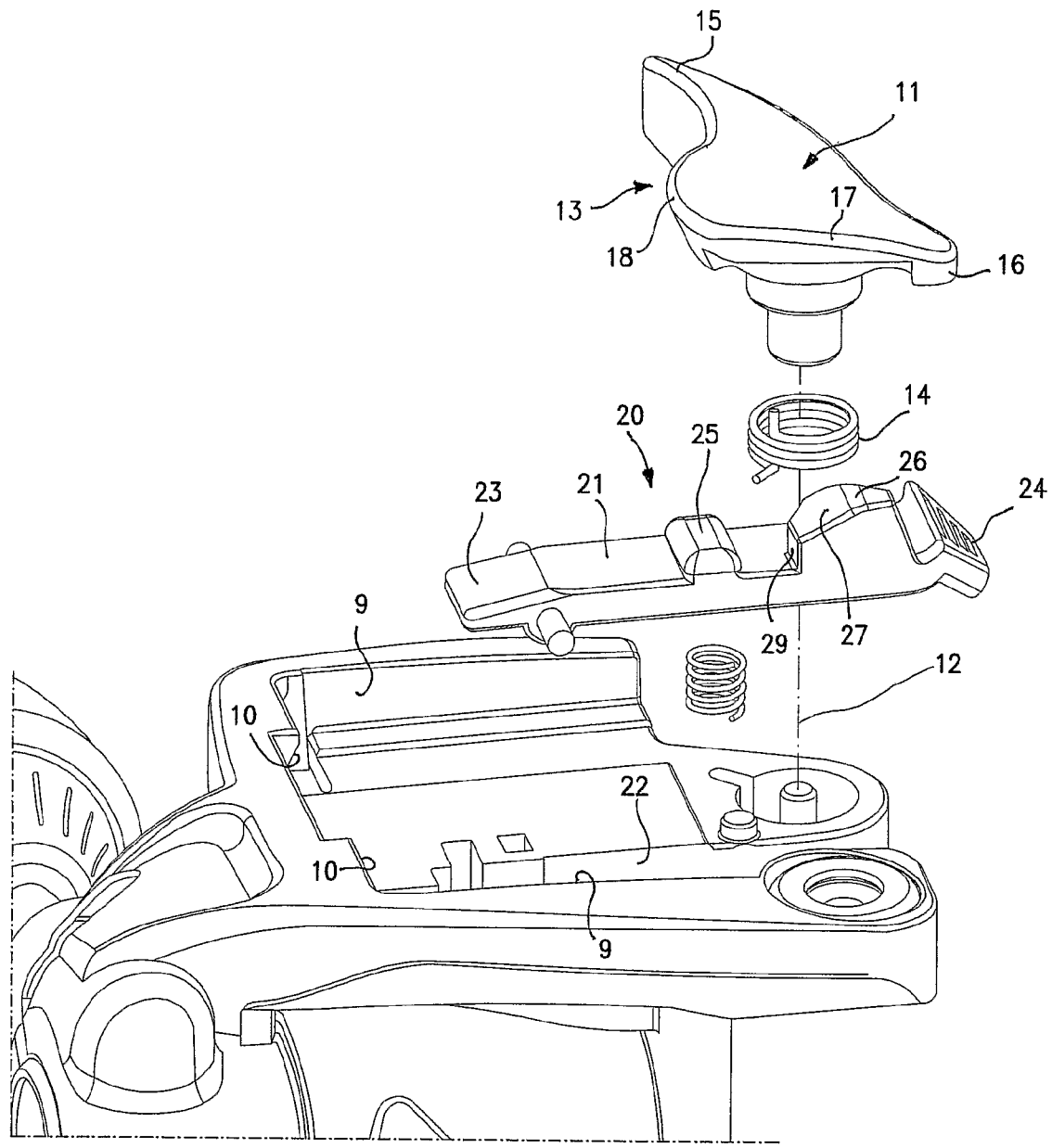
FIG. 3 is a view of a detail of the head in FIG. 2 from a different angle.

In the FIGS. 1 indicates as a whole a head for photographic equipment diagrammatically indicated by 2. A first plate-shaped attachment member 3 is attached to equipment 2; on the top of head 1 there is mounted a second attachment member 4 including a base within which there is provided a seat 5 which is enclosed on three sides and is intended to removably receive plate 3 as will be more particularly explained below. These attachment members together define a quick-fit device according to this invention.

In the example illustrated plate 3 has the shape of an isosceles trapezoid in plan, with corresponding oblique sides 6 and opposing parallel sides 7, 8 and is slightly tapered towards the top (direction of photographic camera 2) in a truncated pyramidal shape. The smaller side 7 and the oblique sides 6 nest in the side edges 9 and front edge 10 of seat 5 respectively. The said lateral and frontal edges 9, 10 together constitute retaining means for holding plate 3 in seat 5. The trapezoidal and truncated pyramidal shape provides the advantage of a self-locking coupling for plate 3 in seat 5, taking up any play. However plate 3 and seat 5 may also be of different shapes, for example rectangular in plan.

A lever operated presser 11 pivots about an axis 12 in order to present a cam profile 13 to the larger side 8 of plate 3. Presser 11 is resiliently forced by a torsion spring 14 towards a position (FIG. 1) in which it engages the larger side of the plate in the condition in which the plate is immobilised. This comprises a lever 15 which extends laterally with respect to cam profile 13 and an appendage 16 projecting from the cam profile on the side opposite the lever.

Cam profile 13 has a first portion 17 which is substantially straight which when presented to plate 3 housed in seat 5 allows it to be removed, and a second active portion 18 which when presented to plate 3 when housed in seat 5 causes it to be immobilised through pressure against retaining edges 9 and 10.

A safety device 20 is also provided to prevent accidental release of presser 11 with consequent release of plate 3. Safety device 20 comprises a spring-loaded arm 21 hinged in a recess 22 in the base of seat 5 and has a first extremity 23 and an opposite extremity 24 in the shape of a trigger. In the intermediate portion thereof onto which plate 3 presses when inserted in seat 5 arm 21 has a projection 25. In the part of the arm external to the plate, between the latter and trigger 24, there is provided a stop-tooth 26 bearing a ramp with an inclined plane 27 on the side facing seat 5 and a shoulder 28 on the opposite side. Between the root of tooth 26 and the base of ramp 27 there is a shoulder 29.

Tooth 26 can act together with appendage 16 to limit movement of cam presser 11 towards the condition of releasing plate 3 in the manner clarified below.

Starting from a condition in which plate 3 is removed from seat 5, arm 21 is pushed into the upwardly tilted position, lever presser 11 is rotated with appendage 16 against shoulder 29 and its section 17 faces seat 5. During this stage there is nothing to prevent plate 3 from being inserted into seat 5. Once the plate has been inserted in the seat, arm 21 is lowered through interference between plate 3 and projection 25 and moves appendage 16 to the base of portion 27. As a result of the action of torsion spring 14 the reaction between appendage 16 and inclined plane portion 27 produces a downward thrust component on arm 21 which is as a consequence lowered until appendage 16 can pass over ramp 27 and bear against shoulder 28. In this condition lever presser 11 abuts against the plate and is immobilised in that position to provide a first "safety" lock for plate 3 in seat 5.

Locking is improved by further rotating presser 11 so that active portion 18 is forcefully engaged against the edge of plate 3 facing it.

In order to release and remove the plate the lever is first released as far as the "safety" position illustrated above. Further release and removal of the plate is only permitted if trigger 24 is deliberately pressed downwards at the same time, rotating lever presser 11. When plate 3 is removed from the seat, arm 21 is caused to return to the raised position immobilising presser 11 through the effect of the interaction between appendage 16 and shoulder 29.

The invention therefore accomplishes the intended aims with the further advantages of simplified and more economical construction, as well as reliable safety which has the additional advantage that it continues to apply even if operated improperly by the user, in addition to a pleasing shape and reduced size.

The invention claimed is:

1. A quick-fit device for video and photographic equipment comprising
    a first attachment member in the shape of a plate which can be fixed to the equipment and a second attachment member including a seat for said plate which can be fixed to a supporting head for said equipment, said second member comprising means for retaining said plate in said seat which will engage an edge of the plate to hold it in said seat, a cam presser positioned in said seat opposite said retaining means to press the edge of said plate against said retaining means and a safety device to prevent accidental release of said presser,
    wherein said safety device comprises a spring-loaded arm which can tilt in the seat and has a stop tooth acting on the presser, said tooth including a ramp with an inclined plane in the part facing said seat and a stop shoulder on the opposite part, said presser including an appendage which can ride over the tooth passing from a position against the ramp to a position against the shoulder in passing from a position in which the plate is released in which it can be removed from the seat and a locked position in which the plate is locked in the seat.

2. A quick-fit device according to claim 1 wherein said retaining means comprise at least one retaining edge provided in said seat.

3. A quick-fit device according to claim 1 wherein said seat is enclosed on three sides and open at the side corresponding to said presser.

4. A quick-fit device according to claim 1 wherein said arm comprises a projection capable of interacting with said plate when the latter is inserted in said seat causing the arm to tilt and lowering said ramp to the level of said appendage.

5. A quick-fit device according to claim 1, wherein said presser comprises a torsion spring acting between the presser and said seat to urge said presser in engagement with the plate.

6. A quick-fit device according to claim 5 wherein said torsion spring is such as to generate a thrust component when the appendage of said presser engages said ramp, sufficient to tilt the said arm for said appendage to ride over said tooth.

7. A quick-fit device according to claim 5 wherein said tooth comprises a shoulder at the base of said ramp against which said appendage abuts when the plate is removed from said seat to retain the presser in a position such as not to interfere with insertion of said plate into said seat.

* * * * *